May 13, 1969  R. S. KLEIN  3,443,599
VAPOR BARRIER JACKETING FOR PIPE STRUCTURES
Filed May 23, 1967
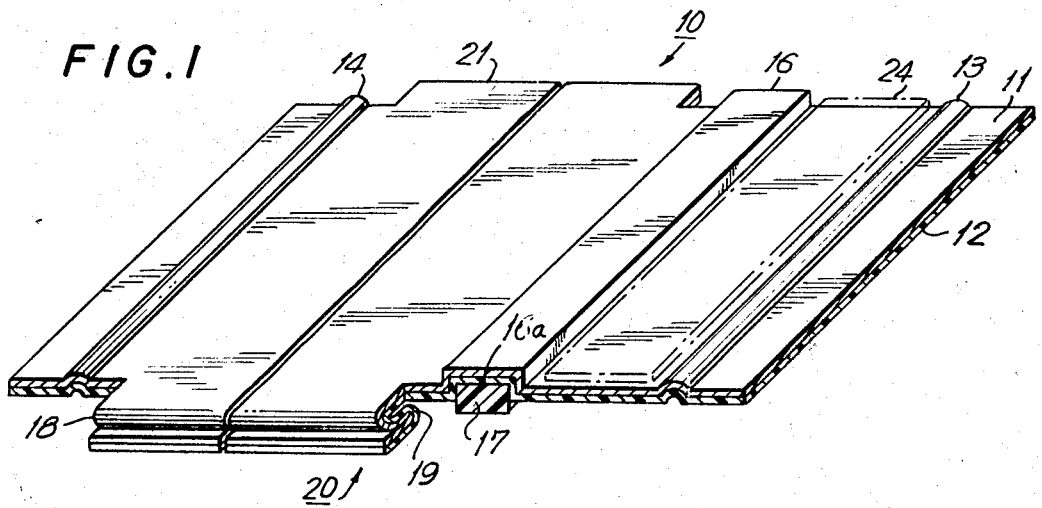
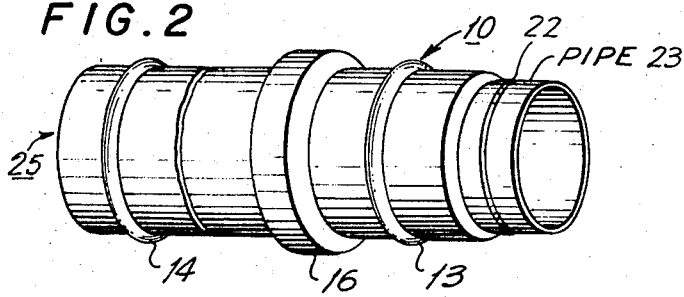
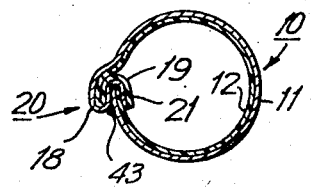
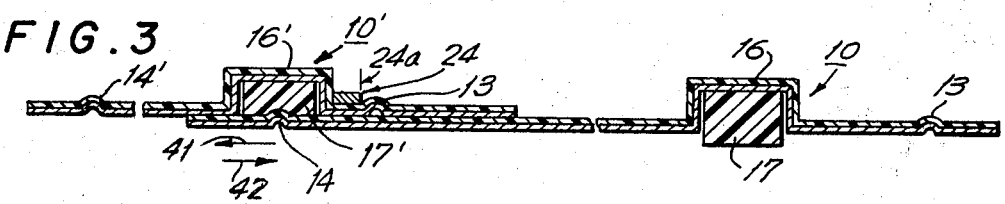
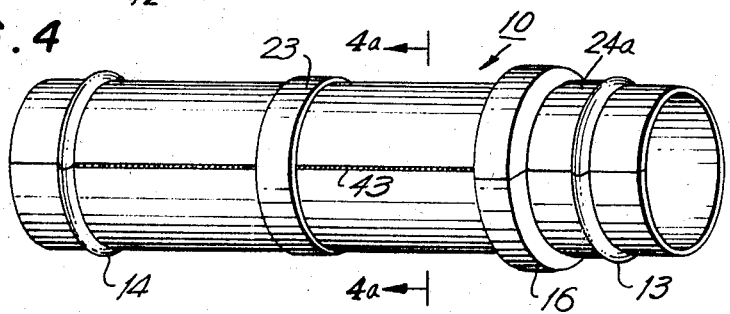
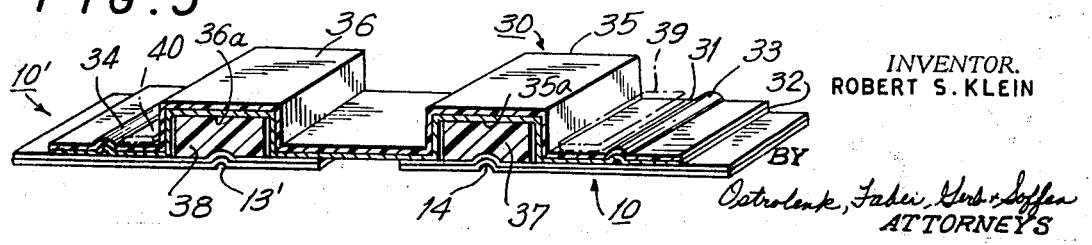
INVENTOR.
ROBERT S. KLEIN
BY
Ostrolenk, Faber, Gerb & Soffen
ATTORNEYS united States Patent Office
3,443,599
Patented May 13, 1969

3,443,599
VAPOR BARRIER JACKETING FOR PIPE STRUCTURES
Robert S. Klein, Levittown, Pa., assignor to Birma Products Corporation, Sayreville, N.J., a corporation of New York
Filed May 23, 1967, Ser. No. 640,747
Int. Cl. F16l 59/14
U.S. Cl. 138—140
12 Claims

ABSTRACT OF THE DISCLOSURE

This invention teaches a vapor barrier pipe jacketing comprised of a laminated assembly preformed for application to pipe, circular ducts and the like wherein joint means are provided for easily and readily joining the end sections of the jacketing about a pipe and wherein resilient means are angularly arranged transverse to the pipe length and along the jacketing interior for providing a good seal between the jacketing and the pipe and for providing a good seal between adjoining sections of jacketing. Each section of jacketing is provided with a raised bead projecting outwardly from the jacketing section when positioned around the pipe and which is designed to cooperate with the resilient means to provide an improved seal between adjacent sections in order to provide a moisture and galvanic barrier for the pipe.

---

The instant invention relates to pipe jacketing and more particularly to pipe jacketing assemblies for use in protecting pipe structures from the elements and to act as a vapor barrier wherein the pipe jacketing structures are comprised of individual sections designed for simple field installation and having a novel overlapping cooperation to provide the above features.

There exists a large variety of structures in both indoor and outdoor installations wherein it is, in certain cases, desirable and in other cases, necessary to provide thermal insulation, environmental protection of high and low temperature walls and protection against corrosive elements. Such systems may, for example include indoor and outdoor piping systems, storage tanks and other vessels, air conditioning and heating duct work, chemical process equipment, vents and many other insulated equipment which has substantially regular shape. Equipment of this sort is found in a variety of industries such as refineries, chemical plants, breweries, dairies, steam generating plants, airports, institutional boiler rooms and utilities, to name just a few. The effects of corrosive elements, condensation due to temperature differences and other external influences impair the surface appearance and further act to deteriorate the ducts.

Protection of such systems necessitate the provision of jacketing around such pipe or duct runs, which jacket is adapted to protect exterior surfaces of such pipes or ducts against deterioration or other harmful effects.

One solution is to provide protective sheathing upon such pipes or ducts prior to installation. This approach makes it difficult to install such systems due to the impracticality of providing jacketing on each pipe section before installation of joining both the pipe and adjacent sections of jacketing during installation.

In order to provide all of the above advantages, I have conceived a pipe jacketing structure which, in one preferred embodiment, is comprised of a substantially flat sheet of a metallic material, preferably aluminum or steel and sometimes having a natural kraft and polyethylene moisture and galvanic barrier bonded to the aluminum or steel surface under heat and pressure to form a continuous bond. The natural kraft barrier is preferably coated with a high melting point polyethylene before the bonding operation. The continuous bonding operation assures the lamination to be free of pinholes or cracks which is especially important in elimination of corrosion and electrolytic action.

The metallic sheet is stamped or otherwise mechanically treated so as to form first and second beads at opposite ends of the sheet, which beads are substantially transverse to the length of the sheet. The sheet is further mechanically worked so as to form a channel which is arranged in spaced parallel fashion and in close proximity with one of the beads formed along the sheet. At least one longitudinal side of the sheet is provided with a double fold forming a narrow channel for receiving the opposite longitudinal side upon assembly thereof around a pipe structure. Such a joint is commonly referred to as a "Pittsburgh" joint or slip joint. The transverse channel receives a substantially flat strip of a resilient material having sealing properties. One suitable material is polyvinyl-chloride.

The pipe jacketing is produced by forming transverse beads and a transverse channel in a flat laminated sheet. After the beads and the channel are formed, the jacketing sheet is then formed in a substantially annular or circular manner to facilitate subsequent assembly about a pipe run. Jacketing sections are shipped in this form for ultimate field application.

Field assembly is carried out by positioning the circularly preformed section around the pipe to be jacketed. The flat longitudinal side is inserted within the narrow channel, or Pittsburgh joint so that the jacketing structure is pulled tightly around the pipe structure. A band may be strapped around the jacketing structure to hold it tightly in place about the pipe. A second jacketing structure of substantially identical configuration is then placed around the adjacent uncovered section of the pipe structure so that its transverse channel containing the resilient strip is positioned immediately over the transverse bead of the first applied jacketing structure which is most remote from the transverse channel. The flat side of the second jacketing structure is then inserted into the Pittsburgh joint and the second jacketing structure is maintained in tight relationship around the pipe by means of a suitable strap or band member. The region between the transverse channel and the bead closest thereto is designed to receive and properly seat such a strap. Additional jacketing structures may be mounted in the same manner.

In cases where it is desired to join two adjacent jacketing sections spaced from one another by a relatively small distance, a coupler strip may be employed. The coupler strip is preferably formed of the same metallic material sometimes having the moisture and galvanic barrier bonded thereto, in the same manner as was previously described. A transverse channel is formed in the coupler strip and positioned substantially intermediate its ends. First and second transverse beads are formed in the coupler strip on opposite sides of the transverse channel. The coupler strip is mounted to the pipe structure in the same manner as was previously described, with the transverse channel containing a resilient strip being positioned to overlie a transverse strip of one of the adjacent jacketing sections and with one annular bead of the coupler strip being positioned beneath the transverse channel of the remaining jacketing section.

The design of the jacketing structures permit simple, rapid field installation requiring no special purpose tools. The Pittsburgh joint provides an excellent seal along the longitudinal seam of the pipe jacketing. An excellent annular seal is maintained between adjacent jacketing sections by means of the surface engagement between the resilient strip of one jacketing section and an annular bead of the adjacent jacketing section. The width of the strip and channel relative to the bead which it receives allows for normal expansion and contraction, while at the same time continuously maintaining an excellent seal therebetween.

It is therefore one object of the instant invention to provide a novel jacketing structure for pipe assemblies and the like which is weatherproof, corrosion resistance, has an attractive appearance and provides an excellent vapor barrier.

Another object of the instant invention is to provide novel jacketing structures for use in protecting pipe structures and the like, and which is comprised of a metallic sheet having at least one transverse bead and a transverse channel receiving a resilient strip, which bead and channel cooperate with the beads and channels of adjoining jacketing sections to provide excellent circumferential seals.

Another object of the instant invention is to provide novel jacketing structures for use in protecting pipe structures and the like, and which is comprised of a metallic sheet having at least one transverse bead and a transverse channel receiving a resilient strip, which bead and channel cooperate witn the beads and channels of adjoining jacketing sections to provide excellent circumferential seals and wherein each jacketing section is provided with a Pittsburgh joint to provide an excellent longitudinal seal for the jacketing sections.

Still another object of the instant invention is to provide novel jacketing structures for use in protecting pipe structures and the like, and which is comprised of a metallic sheet having at least one transverse bead and a transverse channel receiving a resilient strip, which bead and channel cooperate with the beads and channels of adjoining jacketing sections to provide excellent circumferential seals wherein each of said jacketing sections is formed from a substantially flat sheet of a metallic material having a moisture and galvanic barrier layer bonded thereto.

These and other objects of the instant invention will become apparent upon reading the accompanying description and drawings in which:

FIGURE 1 is a perspective view showing a jacketing structure designed in accordance with the principles of the instant invention.

FIGURE 2 is a perspective view showing the manner in which the jacketing structure of FIGURE 1 may be mounted to a pipe structure.

FIGURE 3 is a sectional view of FIGURE 2 showing the manner in which two adjacent jacketing sections cooperate with one another to provide a circumferential seal.

FIGURE 4 is a perspective view showing a jacketing section mounted to a pipe structure in which the Pittsburgh joint is in view.

FIGURE 4a shows a sectional view of the structure of FIGURE 4 taken along the line 4a–4a'.

FIGURE 5 is a perspective view showing a jacketing coupler strip designed in accordance with the principles of the instant invention.

Referring now to the drawings, FIGURE 1 shows a jacketing structure 10 designed in accordance with the principles of the instant invention, and which is comprised of a substantially flat sheet of metal 11, preferably aluminum. A sheet 12 employed as the moisture and galvanic barrier is bonded to the contacting metallic surface under heat and pressure to form a continuous bond therebetween. This continuous barrier, which is free of pinholes or cracks, acts to eliminate corrosion and electrolytic action. The barrier sheet may be comprised of a suitable plastic or polyethylene bonded to the metallic sheet 11.

Subsequent to the bonding process, the jacketing structure 10 is stamped or otherwise mechanically worked so as to form a first transverse bead 13 near the right-hand edge of the jacketing structure, a second transverse bead 14 near the left-hand edge of the jacketing structure, and a transverse channel 16 arranged in spaced parallel fashion relative to bead 13. The bead 13 is spaced from the channel 16 by a distance slightly greater than the width of strip 24 (shown in dotted fashion) to act as a means for facilitating positioning of strap 24 and to prevent strap 24 from moving in the axial direction. A resilient strip of material 17 is bonded to the base surface 16a of channel 16 through the use of a suitable adhesive. Resilient strip 17 preferably is thicker than the depth of the channel 16 to extend well beyond the channel opening for reasons to be more fully described.

One longitudinal edge in the region intermediate transverse bead 14 and transverse channel 16 is bent under at 18 and bent forward again at 19 (see FIGURE 4a) to form a channel 20, commonly referred to as a Pittsburgh joint, for receiving the opposite longitudinal edge 21 in a manner to be more fully described. The jacketing structure 10 may be made of any suitable length such as, for example, 36 inches, 38 inches and 48 inches. The width of each jacketing section is dependent upon the diameter of the pipe structure to which it is to be applied. Each jacketing section is preformed to have a substantially circular contour to facilitate field assembly. A variety of sizes may be provided so as to accommodate pipe structures of varying diameters.

FIGURE 2 shows an assembly 25 which is comprised of a pipe 23 having insulation 22 surrounding the pipe. The insulation 22 is preferably formed of a material having a low conductivity factor. While the arrangement of FIGURE 2 shows the assembly 25 as including insulation, it should be understood that the structure of the instant invention is applicable for use on pipe structures which do not include such insulation. When fully assembled, the jacketing section 10 is positioned around the insulation 22, causing the transverse beads 13 and 14 and the transverse channel 16 to assume an annular configuration.

FIGURE 4 shows a view of one assembled jacketing structure 10 substantially similar to that shown in FIGURE 2 with the seam of the Pittsburgh joint 20 in view. The manner in which the jacketing sections are field applied is by positioning the pre-contoured jacketing section around the pipe structure so that the longitudinal edge 21 is inserted into the Pittsburgh joint or channel 20. This is shown best in FIGURES 1 and 4a. The edge 21 should be urged as far into the Pittsburgh joint 20 as is possible in order to be assured that the jacketing section is fitted tightly around the pipe structure. A strap such as, for example, the strap 26 (FIGURE 4) may be applied to the assembled jacketing structure at a location intermediate its edges in order to maintain a tight fitting around the pipe structure. After a first jacketing structure is applied in this manner such as, for example, the jacketing structure 10, shown in FIGURE 3, the next jacketing structure 10' is applied to the pipe structure so that its resilient strip 17' overlies the channel 14 of the jacketing section 10. The second jacketing section 10' may then be assembled and strapped about the pipe structure in the same manner as was previously described with reference to pipe section 10. Similarly, additional jacketing sections may be applied in the same manner. As shown in FIGURE 4, the transverse beads 13 and 14 and the transverse channel 16 overlap one another slightly so as to form a completely sealed structure. By tightly fitting the second jacketing sections 10' about the pipe structure, the resilient strip 17' is urged against the surface of bead 14 and will deform to the configuration of the bead so as to provide an excellent circumferential seal between the adjacent jacketing sections. The region 24a between bead 13' and channel 16' of jacketing section 10' acts to firmly position and seat a strap 24 which may be applied and tightened about the jacketing structures. Additional jacketing sections may be assembled in a similar manner. The right-hand-most jacket section 10 (FIGURE 3) may not receive a neighbor jacket section in certain applications. For this reason, the resilient strip 17 extends well below the opening in channel 16 to assure a tight fit between the pipe surface and the engaging surface of the resilient strip even in the absence of a bead 14. If desired, the resilient strip 17 may be replaced with a suitable caulking compound injected into channel 16 so as to extend well below the opening in channel 16 to ensure a tight fit around the pipe in the same manner as was previously described.

In applications where the length of the pipe run will not accommodate an exactly even amount of jacketing sections, the coupler strip 30 of FIGURE 5 may be employed. Coupler strip 30 is comprised of a flat sheet of metallic material 31, preferably aluminum to which a high melting point moisture and galvanic barrier 32 is applied, in the same manner as was previously described. The coupler strip 30 is stamped or otherwise mechanically worked so as to form first and second transverse beads 33 and 34 and two transverse channels 35 and 36 which are positioned so as to be substantially equidistant from the beads 33 and 34. Suitable resilient strips 37 and 38, or caulking compound, are bonded or coupled as before with an adhesive to the base surfaces 35a and 36a of channels 35 and 36, respectively. The coupler strip is used in substantially the same manner as the jacketing sections previously described such that the resilient strip 37 is positioned to overlie bead 14 of a jacketing section 10 and such that the resilient strip 38 is positioned to overlie the bead 13' of jacketing section 10'. The length of the channels 16 and 35 of sections 10 and 30, respectively, and the length of their resilient strips 17 and 36, respectively, are sufficient to permit normal expansion and contraction of the assembled jacketing structures while maintaining adequate circumferential seals. For example, considering FIGURE 3, if the bead 14 of section 10 moves in either longitudinal direction shown by arrows 41 and 42, the width of the channel 16' and resilient strip 17' is made sufficient so as to be assured that the bead 14 will be maintained in tight engagement with the surface of resilient strip 17' regardless of the expansion or contraction which may occur. In field application of the jacketing sections, it is, therefore, preferable to position bead 14 at about the center of the resilient strip 17' so as to permit relative movement therebetween in either longitudinal direction while maintaining the circumferential seal.

In certain applications, it may be necessary to have the coupler strip overlie only one jacketing section. For example, let it be assumed that either the jacketing section 10' or 10 is not required. The coupler strip may still provide an excellent vapor barrier due to the surface contact between the resilient strip 38 (or 37) and the engaging surface of the pipe which it surrounds. The coupler strip may be tightly maintained in position through the application of tightening straps 39 and 40 which are seated between channels and beads 35-33 and 36-34, respectively, in the same manner as was previously described.

The coupler strip 30 is also pre-contoured to a substantially circular shape to facilitate its assembly upon a pipe run.

While the Pittsburgh joint acts to provide an excellent longitudinal seal, a suitable sealer may be inserted along the longitudinal seam, as shown at 43 of FIGURES 4 and 4a, in order to further insure an excellent seal therebetween.

The metallic sheet is light in weight, easy to install, and provides an attractive appearance that does not require any painting or other maintenance. The jacketing sections are very simple for use in field application, and do not require the use of any special tools. The longitudinal seal (Pittsburgh joint) and the circumferential seal act to completely seal off the internal pipe structure from the elements and the penetration of water vapor, thereby providing an excellent vapor barrier not heretofore achievable with conventional devices. The seal provided by the Pittsburgh joint may further be improved through the application of a suitable sealer along the entire seam which may either be inserted within the Pittsburgh joint prior to insertion of the opposite longitudinal side of the jacketing section into the joint or subsequent thereto. In field applications where a flame or a heating device may not be used, the sealer employed may be of the nonthermal setting type or any other suitable adhesive or resin which sets at ambient temperature may be employed.

What is claimed is:

1. Jacketing for use in protecting pipe structures and the like comprising:
    a first sheet of metallic material;
    said sheet having a first bead formed near one edge of said sheet and a channel formed near the opposite edge of said sheet, said first bead and said channel being transverse to the longitudinal edges of said sheet;
    a resilient material being secured within said transverse channel.

2. The device of claim 1 further comprising a second bead formed in said sheet being positioned between said transverse channel and said opposite edge.

3. The device of claim 1 wherein one of said longitudinal edges is folded back along a first imaginary line lying a spaced parallel distance from said one longitudinal edge and is folded forward along a second imaginary line lying between said one longitudinal edge and said first imaginary line to form a second channel for receiving the remaining longitudinal edge of said sheet.

4. The device of claim 1 further comprising a vapor moisture and galvanic barrier sheet bonded to one surface of said metallic sheet.

5. The device of claim 1 wherein said sheet is formed of metals taken from the group consisting of aluminum, steel, stainless steel, galvanized steel, galvanized painted steel.

6. The device of claim 4 wherein said barrier sheet is formed of a plastic material.

7. The device of claim 1 wherein said resilient material strip is formed of an elastomeric type material filling said channel.

8. The device of claim 1 wherein said resilient material strip is formed of polyvinyl-chloride.

9. A jacketing assembly for protecting pipe structures and the like comprising at least first and second jacketing structures of the type described in claim 1;
    said first jacketing structure being formed around the pipe structure;
    one transverse edge of the second jacketing structure being formed around the pipe structure and positioned to overlie a portion of the first jacketing structure so that the resilient strip of said second jacketing structure engages said first bead of said first jacketing structure.

10. The device of claim 9 wherein one of said longitudinal edges of each jacketing structure is folded back along a first imaginary line lying a spaced parallel distance from said one longitudinal edge and is folded forward along a second imaginary line lying between said one longitudinal edge and said first imaginary line to form a second channel for receiving the remaining longitudinal edge of its associated sheet.

11. The assembly of claim 10 wherein a suitable sealer is inserted into said second channel.

12. The assembly of claim 9 further comprising a strap mounted around each jacketing structure to maintain the jacketing structures in tight-fitting relationship to the pipe structure.

References Cited

UNITED STATES PATENTS

| | | | |
|---|---|---|---|
| 411,115 | 9/1889 | Wendell | 138—149 X |
| 1,049,544 | 1/1913 | Smith | 138—140 |
| 2,872,946 | 2/1959 | Stueber | 138—140 |
| 3,153,546 | 10/1964 | Dunn | 139—149 X |

LOUIS K. RIMRODT, *Primary Examiner.*

U.S. Cl. X.R.

138—149